United States Patent
Chu et al.

(10) Patent No.: US 7,506,230 B2
(45) Date of Patent: Mar. 17, 2009

(54) TRANSIENT NOISE DETECTION SCHEME AND APPARATUS

(75) Inventors: Sam Gat-Shang Chu, Round Rock, TX (US); Peter Juergen Klim, Austin, TX (US); Michael Ju Hyeok Lee, Austin, TX (US); Jose Angel Paredes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/050,351

(22) Filed: Feb. 3, 2005

(65) Prior Publication Data

US 2006/0184852 A1    Aug. 17, 2006

(51) Int. Cl.
G01R 31/28    (2006.01)

(52) U.S. Cl. .................. 714/726; 714/799; 714/746; 714/718; 714/724; 714/727; 714/731; 714/735; 714/815; 714/48; 714/54; 714/702

(58) Field of Classification Search ................ 714/799, 714/746, 718, 724, 726, 727, 731, 735, 815, 714/48, 54, 702
See application file for complete search history.

(56) References Cited

U.S. PATENT DOCUMENTS

| | | | |
|---|---|---|---|
| 6,453,431 B1 * | 9/2002 | Bernstein et al. | 714/700 |
| 6,476,643 B2 * | 11/2002 | Hugues et al. | 326/93 |
| 6,624,677 B1 * | 9/2003 | Wissel | 327/202 |
| 6,636,980 B1 * | 10/2003 | Gervais et al. | 713/600 |
| 7,188,284 B2 * | 3/2007 | Mitra et al. | 714/726 |
| 2003/0112046 A1 * | 6/2003 | Atallah et al. | 327/175 |

* cited by examiner

*Primary Examiner*—Jacques H Louis-Jaques
*Assistant Examiner*—Guerrier Merant
(74) *Attorney, Agent, or Firm*—Yee & Associates, P.C.; Diana L. Robert-Gerhardt

(57) ABSTRACT

A method, system and apparatus for detecting soft errors in non-dataflow circuits. In a preferred embodiment, input is received at a latch system. The latch system consists of two pairs of latches. The second pair of latches is parallel to the first pair of latches. Both pairs of latches capture the input. However, the second pair of latches captures the input later in time relative to the first pair of latches latch. The captured input is then transferred from the first latch in each pair of latches to the second latch in each pair of latches. A comparison is made of the input in the two second latches. If the input captured in the two second latches is not the same, then a message is sent to a recovery unit.

10 Claims, 2 Drawing Sheets

TRANSIENT NOISE DETECTION SCHEME AND APPARATUS

BACKGROUND OF THE INVENTION

1. Technical Field

The present invention relates to integrated circuits. In particular, the present invention relates to a method and apparatus for soft error detection in non-data flow (control) circuits.

2. Description of Related Art

Today, a widespread and growing use of semiconductor chips is present in every aspect of daily life. Chips are no longer found just in TVs, VCRs and CD players. Increasingly, chips are replacing relays and mechanical systems that we depend upon to function continuously, twenty-four hours a day. In some cases, these chips are exposed to harsh environments. As such, a major concern in the semiconductor industry today is signal integrity. As minimum layout dimensions continue to shrink, signal integrity becomes harder to maintain. Multiple causes and effects are present that impact signal integrity. One cause that is having an increased impact on Very Large Scale Integration (VLSI) technologies is "soft errors."

Soft errors, also sometimes referred to as transient errors or single event errors (SEE) or single event upsets (SEU), are errors that are due to temporary conditions of use and the environment. As such, soft errors occur in a statistically unpredictable fashion. If a chip is susceptible to these errors it could fail at any time. In cases of applications that require a high level of reliability, such as high-end computing, monetary transactions and secure network systems, soft error failures can be devastating.

Typical causes of soft errors are ground bounce, radiation and crosstalk. Soft errors can be categorized into two kinds of soft errors, chip-level and system-level. Chip-level soft errors are errors that typically occur when the radioactive atoms in the chip's material decay and release alpha particles into the chip. However, depending on usage, radiation from external sources can have the same effect. Because an alpha particle contains a positive charge and kinetic energy, the particle can hit a memory cell and cause the cell to change state to a different value. The atomic reaction is so tiny that it does not damage the actual structure of the chip. System-level soft errors are errors that occur when the data being processed is hit with a noise phenomenon, typically when the data is on a data bus. The computer tries to interpret the noise as a data bit, which can cause errors in addressing or processing program code. The bad data bit can even be saved in memory and cause problems at a later time.

With the increased layout density in VLSI chips, crosstalk and ground bounce are becoming more common place occurrences. Soft errors on non-data flow ("control") circuits are particularly difficult to detect. Several methods exist for detecting soft errors in data flow circuits, such as adding bits for parity and error correcting code. However, these are not practical solutions for control circuits, as control circuits require in-depth knowledge of seemingly unrelated control logic cones.

Therefore, it would be advantageous to have an improved method and apparatus for soft error detection in control circuits.

SUMMARY OF THE INVENTION

The present invention solves the disadvantages of the prior art by providing a method for detecting soft errors in non-data flow circuits. The present invention provides a method and apparatus for detecting soft errors in non-dataflow circuits. In a preferred embodiment, input is received at a latch system. The latch system consists of two pairs of latches. The second pair of latches is parallel to the first pair of latches. Both pairs of latches capture the input. However, the second pair of latches captures the input later in time relative to the first pair of latches latch. The captured input is then transferred from the first latch in each pair of latches to the second latch in each pair of latches. A comparison is made of the input in the two second latches. If the input captured in the two second latches is not the same, then a message is sent to a recovery unit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
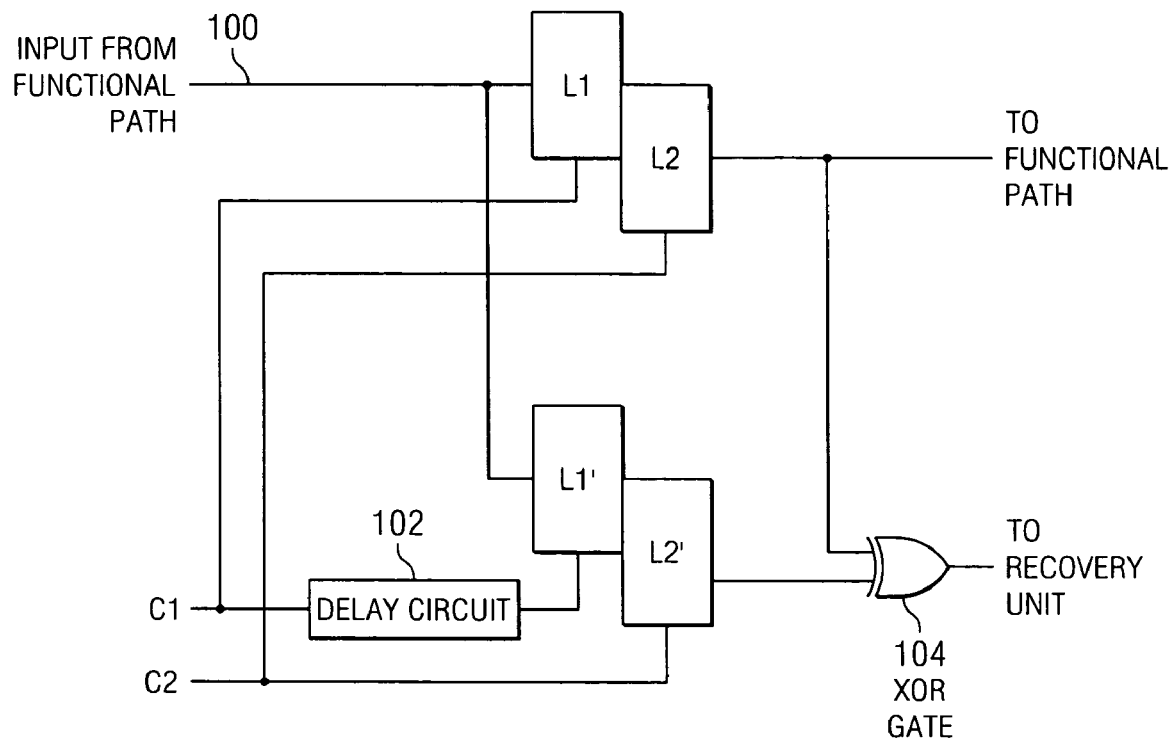
FIG. 1 is a block diagram of the soft error detecting scheme in accordance with a preferred embodiment of the invention.

With reference now to the figures and in particular with reference to FIG. 1, a block diagram of the soft error detecting scheme in accordance with a preferred embodiment of the invention. Input from functional path 100 travels to two pairs of latches, a first pair of latches, latches L1 and L2 and a second pair of latches, latches L1' and L2' that are parallel to the first pair of latches. Clock C1 sends a pulse to latches L1 and L1' that causes the latches to capture the logic state of the input (data). Clock C2 sends a pulse to latches L2 and L2'. Clocks C1 and C2 are non-overlapping clocks, which means the pulse from clocks C1 and C2 are orthogonal pulses. Latches L1 and L1' capture the data when clock C1 closes. However, delay circuit 102, described more fully in FIG. 2 below, delays the pulse from clock C1 on its way to latch L1', such that latch L1' captures the data later in time relative to when latch L1 captures the data. This delay is of sufficient length to allow the circuit to recover from any soft error that may have occurred. The data is passed from L1 to L2 and from L1' to L2' when clock C2 closes. This guarantees that the data is compared only after the closing of clock C1. The contents of latch L2 and latch L2' are then sent to XOR gate 104. XOR gate 104 then compares the contents of latch L2 with the contents of latch L2'. If the contents are different, a soft error has occurred and the data captured by latch L2 may be corrupted. A message is then sent to a recovery unit that an error has occurred.

Circuits are capable of correcting soft errors automatically. However, the soft error may not be recovered before incorrect information is stored or passed on. Since it is of no consequence if a soft error recovers before the end of the cycle, the mechanism of the current invention in the illustrative example, only detects changes of logic state after the closing of a clock cycle. This is done by adding latches that are parallel to the regular latches in order to capture the data with a delayed pulse clock. However, the delay caused by delay circuit 102 should not be so long as to cause parallel latch L1' to capture information from latch phase two instead of latch phase one.

Figure 2:
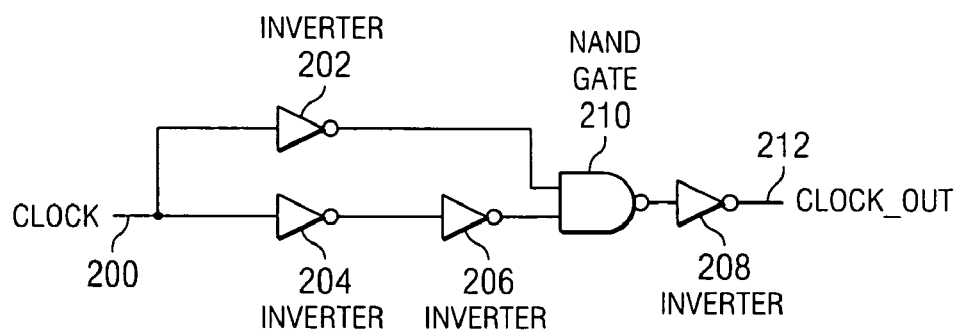
FIG. 2 is a block diagram of a method for a delay circuit in accordance with a preferred embodiment of the invention.

FIG. 2 is a block diagram of a method for a delay circuit in accordance with a preferred embodiment of the invention. The depicted delay circuit is like delay circuit 106 in FIG. 1. From clock_in 200, a pulse travels down the circuit path. The pulse then splits down two paths. Along one path, the pulse encounters inverter 202. Down the other path, the pulse encounters two inverters 204 and 206. The two inputs then enter NAND gate 210. The pulse then continues on to inverter 208. The pulse then continues traveling in clock_out 212 direction.

This circuit effectively delays the pulse from clock C1 in FIG. 1 for a long enough period of time to allow the input from functional path 100 to recover from any soft error. While the above delay circuit has been described in the terms of a 1-Shot, circuit, those skilled in the art will recognize that many other types of circuits can be used to delay a pulse from clock C1. The type of delay circuit and the length of the delay used can vary based on the implementation and technology concerned.

Figure 3:
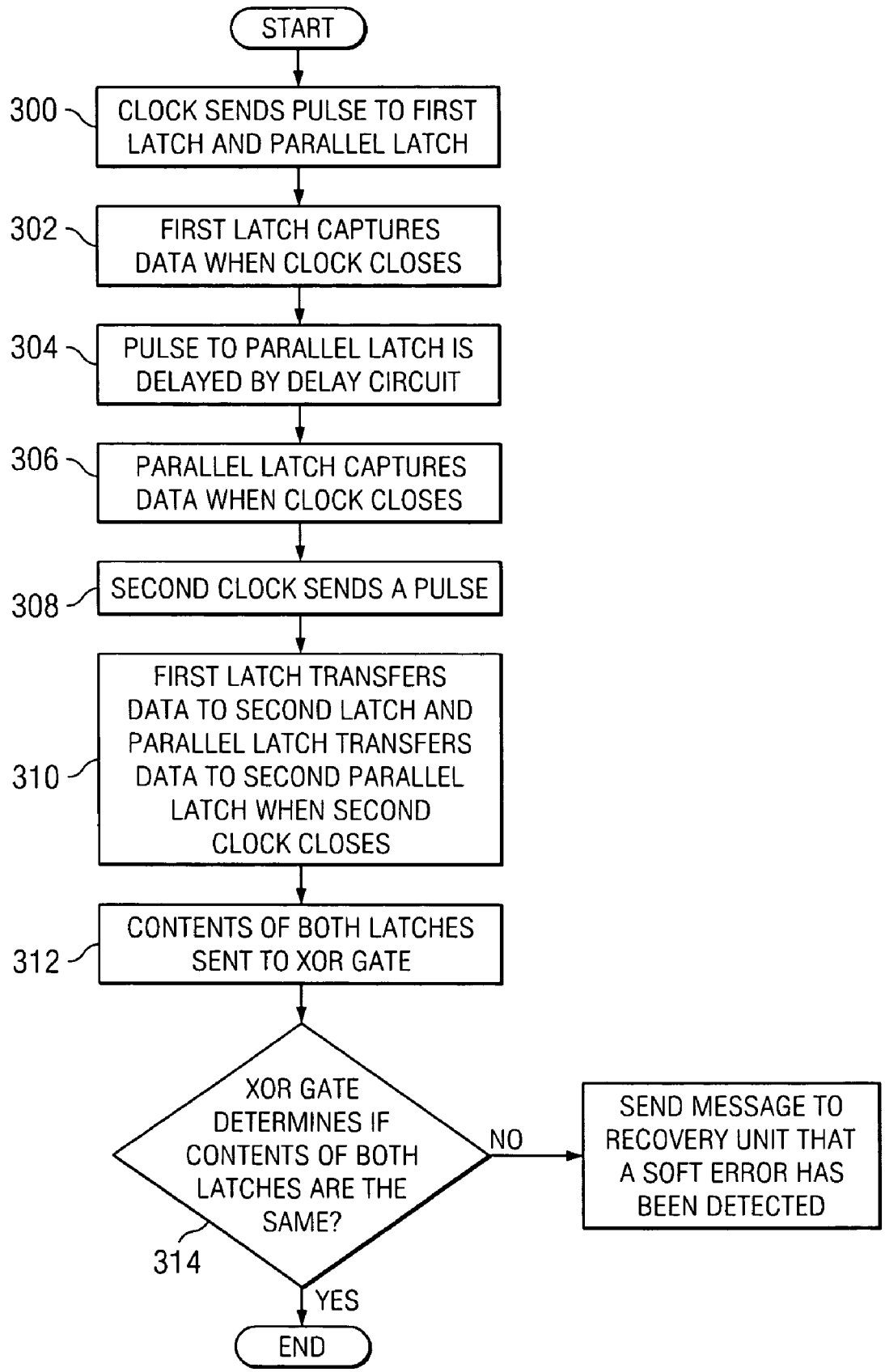
FIG. 3 is flowchart that illustrates a method for checking for soft errors in accordance with a preferred embodiment of the invention.

FIG. 3 is flowchart that illustrates a method for checking for soft errors in accordance with a preferred embodiment of the invention. The process starts when a clock, like clock C1 in FIG. 1, sends a pulse to a pair of latches, a latch and a parallel latch, like latches L1 and L1' in FIG. 1 (step 300). The first latch captures the data when the clock closes (step 302). The clock pulse to the parallel latch is delayed from reaching the parallel latch by a delay circuit, like the circuit in FIG. 2 (step 304). The parallel latch then captures the data when the clock closes, but at a slightly later time than when the first latch captured the data (step 306). A second clock, like clock C2 in FIG. 1, sends a pulse. (step 308). The first latch transfers the data to a second latch, like latch L2 in FIG. 1 and the parallel latch transfers the data to a second parallel latch like latch L2' in FIG. 1 when the clock closes (step 310). The contents of both latches are sent to the XOR gate (step 312). The XOR gate determines if the contents of the latches are the same (step 314). If they are the same (yes output for step 314), then the process ends. If they are different (no output for step 314), then a soft error has occurred and a message is sent to a recovery unit that a soft error has been detected.

Thus, the present invention solves the disadvantages of the prior art by providing a method for detecting soft errors in non-data flow circuits. The present invention provides a method and apparatus for detecting soft errors that did not self-correct before the end of a cycle. Circuits are capable of correcting soft errors automatically. However, the soft error may not be recovered before incorrect information is stored or passed on. Since it is of no consequence if a soft error recovers before the end of the cycle, the current invention only detects changes of logic state after the closing of a clock cycle. This is done by adding a parallel latch to work in conjunction with the first latch. The parallel latch captures the result with a delayed pulse clock. However, the delay caused by the delay circuit should not be so long as to cause the parallel latch to capture information from latch phase two instead of latch phase one. Then the contents of both latches are compared. If the contents are different, a message is sent to a recovery unit that a soft error has been detected.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting soft errors in non-data flow circuits, the method comprising:
   receiving input at a latch system, wherein the latch system comprises two pairs of latches and wherein a second pair of latches is parallel to a first pair of latches, wherein each pair of the latches comprises a first latch and a second latch having a data input coupled to a data output of the first latch, wherein data inputs of the first latch for each of the pair of latches are coupled together, and wherein clock inputs of the second latch for each of the pair of latches are coupled together;
   capturing the input by the first latch of each of the pair of latches, wherein the first latch of the second pair of latches captures the input later in time relative to the first latch of the first pair of latches, wherein the step of capturing the input is triggered by a first clock sending a pulse to the first latch of each of the two pairs of latches, wherein the first clock's pulse to the fist latch of the second pair of latches is delayed with respect to the first clock's pulse to the first latch of the first pair of latches;
   transferring the input captured from the first latch in each pair of latches to the second latch in the pair of latches, wherein the step of transferring the input captured is triggered by a second clock sending a pulse to the clock inputs of the second latch for each of the two pairs of latches, wherein pulses of the first and second clocks are orthogonal, non-overlapping pulses with respect to one another; and
   responsive to a determination that the input captured by the two pairs of latches does not match, sending a message to a recovery unit.

2. The method of claim 1, wherein the delay is caused by a delay circuit.

3. The method of claim 2, wherein the delay circuit is a 1-shot circuit.

4. The method of claim 1, wherein the determination that the input captured by the two pairs of latches does not match is performed by an XOR gate.

5. A system for detecting soft errors in non-data flow circuits, the system comprising:
   receiving mechanism for receiving input at a latch system, wherein the latch system comprises two pairs of latches and wherein a second pair of latches is parallel to a first pair of latches, wherein each pair of the latches comprises a first latch and a second latch having a data input coupled to a data output of the first latch, wherein data inputs of the first latch for each of the pair of latches are coupled together, and wherein clock inputs of the second latch for each of the pair of latches are coupled together;
   capturing mechanism for capturing information by the first latch of each of the pair of latches, wherein the first latch of the second pair of latches captures the input later in time relative to the first latch of the first pair of latches, wherein the capturing mechanism is triggered by a first clock sending a pulse to the first latch of each of the two pairs of latches, wherein the first clock's pulse to the first latch of the second pair of latches is delayed with respect to the first clock's pulse to the first latch of the first pair of latches;
   transferring mechanism for transferring the input captured from the first latch in each pair of latches to the second latch in the pair of latches, wherein the transferring mechanism is triggered by a second clock sending a pulse to the clock inputs of the second latch for each of the two pairs of latches, wherein pulses of the first and second clocks are orthogonal, non-overlapping pulses with respect to one another; and sending mechanism, responsive to a determination that the input captured by the two pairs of latches does not match, for sending a message to a recovery unit.

6. The system of claim 5, wherein the delay is caused by a delay circuit.

7. The system of claim 5, wherein the determination that the contents of the first and second latch do not match is performed by an XOR gate.

8. An apparatus for detecting soft errors in non-data flow circuits, the apparatus comprising:

a latch system, wherein the latch system comprises two pairs of latches and wherein a second pair of latches is parallel to a first pair of latches, wherein each pair of the latches comprises a first latch and a second latch having a data input coupled to a data output of the first latch, wherein data inputs of the first latch for each of the pair of latches are coupled together, and wherein clock inputs of the second latch for each of the pair of latches are coupled together;

wherein an input at the latch system is captured by the first latch in each pair of latches in response to a first clock sending a pulse to the first latch of each of the two pairs of latches, and wherein the first latch of the second pair of latches captures the input later in time relative to the first latch of the first pair of latches wherein the first clock's pulse to the first latch of the second pair of latches is delayed with respect to the first clock's pulse to the first latch of the first pair of latches;

wherein the input captured by the first latch in each pair of latches is transferred to the second latch in the pair of latches in response to a second clock sending a pulse to the clock inputs of the second latch for each of the two pairs of latches, wherein pulses of the first and second clocks are orthogonal, non-overlapping pulses with respect to one another; and wherein, responsive to a determination that the information in the latches does not match, a message is sent to a recovery unit.

9. The apparatus of claim 8, wherein the delay is caused by a delay circuit.

10. The apparatus of claim 8, wherein the determination that the contents of the first and second latch do not match is performed by an XOR gate.

* * * * *